United States Patent [19]

Topping

[11] Patent Number: 4,897,635

[45] Date of Patent: Jan. 30, 1990

[54] ROTARY DEVICE SYNCHRONIZER

[76] Inventor: Frederick V. Topping, 3 Kirkton Rd., Downsview, Ontario, Canada, M3H 1K6

[21] Appl. No.: 264,841

[22] Filed: Oct. 31, 1988

[51] Int. Cl.⁴ ............................................. G08B 21/00
[52] U.S. Cl. .................................... 340/681; 324/161; 340/691
[58] Field of Search ................. 340/681, 691; 324/161, 324/166

[56] References Cited

U.S. PATENT DOCUMENTS 2,232,753  2/1941  Wilson ................................ 340/681
4,499,760  2/1985  Fischer et al. ...................... 324/161

*Primary Examiner*—Glen R. Swann, III

[57] ABSTRACT

A synchronization indicator for a pair of rotating devices compares pulses generated by the two devices cyclically respectively pro-portional to their rotary speeds by using a predetermined count of one set of pulses to determine the then count of the other set and uses the count of the other set to cyclically provide a progressive indication of relative speed of the devices.

24 Claims, 2 Drawing Sheets

ROTARY DEVICE SYNCHRONIZER

BACKGROUND OF THE INVENTION

This invention relates to a synchronizing indicator for indicating the approach to equality of speeds of two rotary devices.

It's primary use is thought to be for synchronizing the rotation speeds of twin engined ships or aircraft, although it may be used to synchronize any two rotary devices which may be each equipped to produce a set of signals from which may be derived pulses having a rate proportional to their respective speeds of operation.

By 'synchronization' herein is intended the meaning that the twin rotary devices may be controlled to bring their speeds toward equality within design limits as hereinafter described. 'Synchronization' does not, in this application, imply the kind of precision required to mesh the gears of two rotating machines.

In the past, methods of synchronization of two rotary devices have used a pair of lamps to indicate which device is rotating faster than the other. However with such a display, the resultant attempts to equalize the speed tend to result in overshooting. Where a third lamp is employed to indicate that the rotary speeds of the two devices are within a design synchronization range, the operator has no way of knowing when the engines are close to the limits of the synchronization range so that there frequently results a flashing between the lamps.

SUMMARY OF THE INVENTION

In one aspect of the invention, there is provided a synchronization indicator having a progressive display wherein display elements are successively illuminated or altered, in one direction or the opposite to indicate that one engine is faster or slower than the other and wherein the rate of successive illumination is proportional to the speed ratio, thus being independent of actual speed.

The progressive display and a second display preferably employed herein will both usually be visual. However there is no need that this be so and the display may be audible or detectable by touch. Thus the term 'sensible' is used to relate to the display in its broad aspects.

In accord with one facet of the invention there are provided a predetermined number of sensible elements (commonly but not necessarily light emitting diodes ('LEDS' hereafter), each sensible element having ON and OFF states. The elements are arranged so that when individually energized in a predetermined sequence, they provide a progressive display. Such elements are maintained normally in an OFF state. Means are provided for deriving from each rotary device a series of pulses at a rate proportional to their rotation rates. Cyclic means are provided responsive to one series of pulses to successively individually designate said sensible elements in said sequence and means are provided cyclically responsive to the occurrence of a predetermined number of the other series of pulses to provide a strobing pulse. Means are provided responsive to the strobing pulse for turning the then-designated sensible element to the ON state. In many displays utilizing the invention it will provide a more distinctive display if the means for turning the designated sensible element to ON also turns any element previously ON, to OFF. Usually the indicator will be designed so that the designated elements turned ON by successive strobing pulses can't be non-adjacent in the predetermined sequence to improve the display. Preferably the number of pulses to complete a cycle of the cyclic means coincides with the number of pulses for the cycle of the strobing pulse. This greatly simplifies the control of the display as will be evident in the preferred embodiment described hereafter.

In a preferred aspect of the invention the progressive display discussed above is used as the near-synchronization indicator (sometimes called herein the 'near-sync' indicator and is combined with a coarse adjustment indicator sometimes called herein the 'out-of-sync' indicator. The out-of-sync indicator is designed to determine whether the ratio of the smaller to the larger rate of the two rotary devices is less than a predetermined amount and give an indication of which is the slower rotating device. At the same time the near-sync and out-of-sync indicators are preferably connected so that the out-of-sync indicator only enables the near-sync indicator to operate when the rotation rate ratio is large enough that the progressive display cannot successively switch ON non-adjacent stages or elements in the progressive display. It is further preferably provided that the out-of-sync indicator is enabled when the near-sync indicator is disabled and vice versa. If this is not possible the out-of-sync adjustment is preferably disabled at a ratio above that at which the near-sync indicator is enabled.

The invention as so far described has the advantage, since it operates on proportional rather than absolute difference, that it is useful over a wide rotational speed range. Present designs operate over 500–5000 rpm range but this range can be raised, lowered, or widened as desired. The provision of both coarse and fine ranges allows for provision of a combined range, rapid adjustment of the relative speeds to the near-sync range and sensitive adjustment within the latter. After synchronization or near-synchronization has been achieved the near-sync indicator will provide a continuing indication of relative synchronization. Both out-of-sync and near-sync indicators separately and collectively are easy to interpret. Moreover the operation is symmetrical so that the indication for one device slower is similar but reversed to the indication for the other device slower.

In a preferred form of the invention, digital techniques are used which tend to ensure absolute proportional accuracy over wide temperature ranges.

In a preferred form of the near-sync indicator with both rotary devices producing a series of pulses proportional to their speed, one series of pulses is used to power a continuous ring counter having a predetermined number of stages thus successively designating adjacent stages and each stage is connected to the input of a latch. The latch outputs are connected to individually energize sensible indicators in a progressive display which is preferably a series of LED's or lights arranged in a circle. The other series of pulses is used to produce a strobing pulse every cycle of pulses equal to the number of stages, which is supplied to each latch. Each latch then connects its respective inputs and outputs resulting in the illumination of the only indicator in the progressive display which corresponds to the then designated stage of the cyclic counter. The effect of the latch for the ON indicator is to maintain the indicator ON until the receipt of the next strobing pulse. With the next strobing pulse, the latch is again operated to light the same stage of the progressive display or the stage on either side. (It being noted that the near-sync indicator is only activated when the rotary speed ratio is large enough to limit changes of display stages to the adjacent stage per strobing pulse). The use of the latch maintains the illumation of the display element until the next strobing pulse as long as the near-sync indicator is not disabled.

The design of the coarse or out-of-sync indicator preferably also uses a pair of counters each one connected to receive a series of the engine pulses and to provide a reset pulse for both counters when a predetermined count is reached in either one of them. The counters and associated circuitry are designed to start approximately simultaneously and so that if a count difference is achieved above a predetermined amount before reset then a second display is activated indicating which rotary device is running slower. The amount is selected so that count difference below this amount represents a proportional speed difference below that at which the progressive display would move more than one stage between strobing pulses. Thus the out-of-sync indicator is preferably designed to enable the near-sync indicator for count differences below the amount and disable it for count differences above and preferably to disable and enable the second display below and above such amount. As with the near-sync indicator it will be noted that the out-of-sync indicator operates on proportional rather than absolute speed differences and is thus adapted for use over wide rotational speed ranges.

BRIEF DESCRIPTION OF THE DRAWINGS

In drawings, which illustrate a preferred embodiment of the invention.

DESCRIPTION OF THE PREFERRED EMBODIMENT

Figure 1:
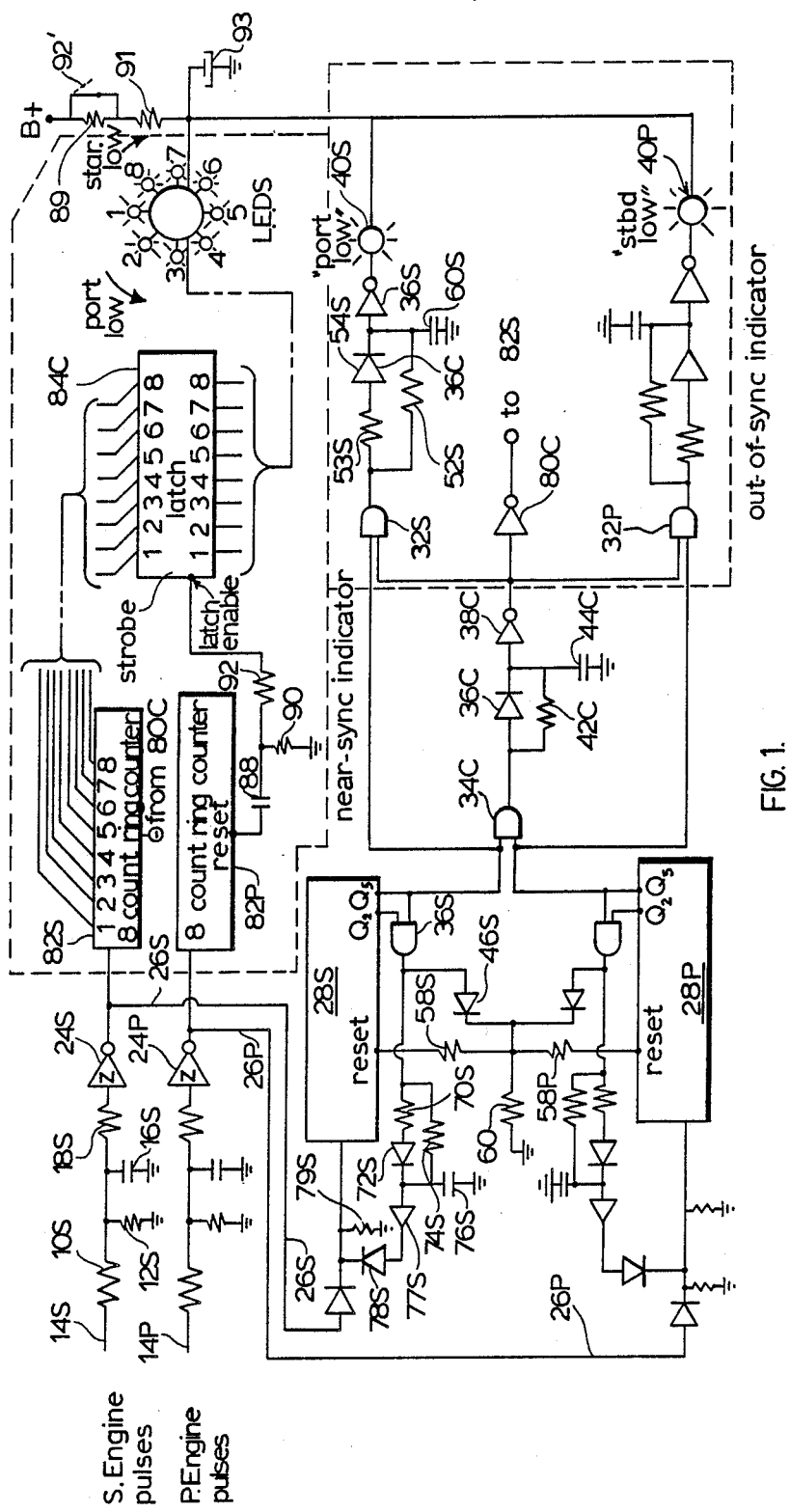
FIG. 1 is a circuit for providing the displays in accord with the invention.
Figure 2:
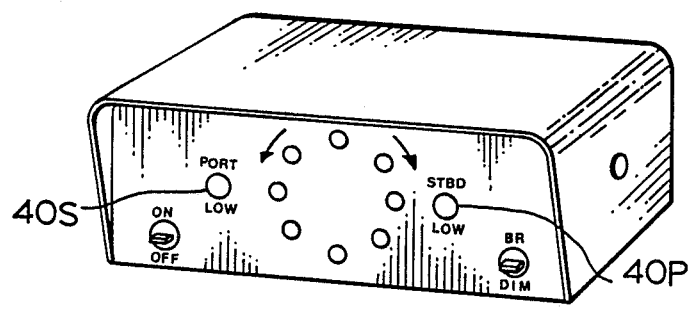
FIG. 2 is a drawing of the outside of the indicator casing.

In describing the preferred embodiment of invention it will be understood that a series of pulse signals are derived from two rotary devices which are a pair of marine or aircraft engines. Such series of pulses may be derived in any of a large number of convential ways. In my preferred application, using four-stroke, eight-cylinder gasoline marine engines of 500 to 5000 rpm, I use the ignition pulses to produce 33 to 330 pulses per second for operation of the indicator.

In the drawings, circuits driven by starboard pulses are at the top and the port at the bottom.

Circuit elements associated with the starboard and port engines are designated S and P and the circuit elements common to the two circuits are designated C.

Pulses from the starboard and port engines are provided along lines 14S and 14P. In FIG. 1 resistance 10S, 12S form a voltage divider for the starboard engine pulses received along lines 14S, resistor-capacitor pair 10S–16S form a filter, to ground high frequency components of the pulses. The pulses are then applied to a Schmidt trigger 24S which acts to eliminate voltages below a certain threshold. Resistor 18S acts to limit maximum input voltages to the Schmidt.

The Schmidt trigger and the filter preceding it eliminate from the Schmidt output, spurious pulses, which are inherent in ignition signals. The invention extends to circuitry wherein the Schmidt trigger is not used and the engine pulses are applied directly to the counters. However the circuitry using the Schmidt trigger is the best known to me.

Pulses from the Schmidt trigger 24S are supplied along line 26S to the out-of-sync (preferably ripple) counter 28S. Similar 'port engine circuitry' results in the supply of pulses from Schmidt trigger 24P to the out-of-sync counter 28P. The counters 28S or 28P are designed to provide an ON output after the 16th and 18th pulses (corresponding to 15 and 17 pulse intervals) at their terminals $Q_5S$, $Q_2S$, or $Q_5P$, $Q_2P$ respectively. Thus the 16th pulse at $Q_5$ of the counter with the then-higher count is maintained until the reset pulse which results from $Q_2$ going HIGH when the higher-running counter reaches the 18th pulse. The term HIGH is synonymous with positive herein. The reset HIGH from $Q_2$ results in a reset pulse from AND gate 36S. (The description assumes that the starboard engine is running faster so that the higher count will always be on the S counters. The reverse situation will be obvious by reversal of the S and P designations.) The HIGH from $Q_5S$ is provided on the input of AND gates 36S, 32S and 34C and remains there until counter 28S and counter 28P are reset.

At gate 34C there is a LOW output when either $Q_5S$ or $Q_5P$ is LOW and a HIGH output when both $Q_5S$ and $Q_5P$ are HIGH. A gate 34C HIGH output passes through diode 36C and inverter 38C to appear as a LOW at one terminal of each of AND gates 32S, 32P. The resistance 42C and capacitor 44C connected as shown act with diode 36C act as a pulse shaping circuit. The pulse appearing at the input of 36C can be extremely short and the pulse shaping circuit slows the decay of its output to 'stretch' the time extent of the pulse to that desired. The pulse shaping circuit provides a positive or HIGH signal at the input of inverter 38C that is longer than the positive or HIGH signal from 34C. Resistance 42C and capacitor 44C are designed (noting inverter 38C) to maintain the LOW applied to 32S and 32P, resulting from a HIGH at 34C output, over the intervals between cycles of the faster counter 28S or 28P for successive HIGH's at 34C output (indicating a continuing near-sync condition of the two engines). It will be found that the time constant or high pulse width duration provided by the circuit 42C–44C determines the minimum (ratio of lower to higher) rotary speeds at which the near-sync indicator will operate continuously.

While the output of $Q_5P$ remains LOW, the 38C input to 32S remains HIGH. Thus when the starboard engine is sufficiently faster than the port that counters 28S, 28P are always reset before $Q_5P$ goes HIGH, then the LOW output at $Q_5P$ produces a continuing HIGH input at terminal 2 of 32S so that each time $Q_5S$ goes high the output of 32S goes HIGH. The HIGH output of 32S is provided through diode 54S and inverter 36S to LED 40S to cause it to go to ON under the energization supplied. Resistor 52S and capacitor 60S in combination with diode 54S act as a pulse shaping circuit like that previously described to lengthen the duration of the HIGH pulse from 32S so that the ON condition at 40S is maintained between successive HIGH outputs from 32S. The ON condition resulting from the out-of-sync conditions is used to signal PORT ENGINE LOW.

When the starboard engine is not sufficiently faster than the port and $Q_2S$ does not reset counters 28S and 28P before a HIGH at $Q_5P$ then the simultaneous highs at $Q_5S$ and $Q_5P$ produce a HIGH output at 34C and a LOW output at 32S (and 32P) and prevent the illumination of LEDS 40S (port Low) and 40P (starboard low).

The resistance 42C and capacitor 44C are designed to maintain the LOW at the output of 38C between recurring outputs of 34C to prevent lighting of the LED 40S while the near equality of the engine pulse rates subsists, since recurring cyclical contemporaneous HIGHS at $Q_5S$, $Q_5P$ maintain LOW at terminal 2 of 32S. If the port engine is sufficiently slower than the starboard that $Q_5P$ does not go HIGH before $Q_5S$ goes LOW then the resulting HIGH condition at input 2 of 32S causes LED 40S to illuminate during each cycle when $Q_5S$ goes high—indicating that the port engine is low by a greater degree than that represented by the near-sync range to be hereinafter discussed.

The reverse effects of course occur if the port engine is faster than the starboard.

When $Q_2S$ goes HIGH at the 18th pulse in counter 28S, $Q_5S$ is already HIGH, being so since the 16th pulse. Thus the output of 36S goes HIGH to reset both counters through diode 46S. Bleeder resistor 60 prevents voltage build up and resistances 58S and 58P isolate the counter resets from each other. At the same time the HIGH, output of 36S passes through resistance 70S and diode 72S and is applied to the pulse-widening circuit composed of resistance 74S and capacitor 76S to the input of amplifier 77S. The widened pulse at the output of rectifier 78S applies a first (extra) pulse to counter 28S. The extra pulse ensures that counter 28S, corresponding to the faster engine, receives (after reset) a pulse before any pulse for counter 28P arrives along line 26P. Otherwise, due to the reset phasing, 28P would usually receive the first pulse after an 18th pulse at 28S ($Q_2S$ HIGH) had caused a reset. It will be noted that, due to the extra pulse, it is necessary to provide for two pulse intervals between $Q_5$ HIGH and $Q_2$ HIGH to ensure that the reset pulse for 28S and 28P is triggered by the higher-speed engine. It is also noted that except in the very unlikely event that the extra pulse is "in step" with the motor-generated pulses the first interval in the faster engine counter will be smaller than the remainder since the start pulse is synthesized from the $Q_5S$, $Q_2S$ outputs. However the inclusion of a first short pulse interval removes an ambiguity in the circuit operation and does not detract from the operation of the device.

As previously noted, with a faster starboard engine, as long as $Q_2S$ goes HIGH before $Q_5P$ the signal at the output of 38C remains HIGH. The output of 38C is inverted at inverter 80C to provide a continuing LOW output for recurring condition $Q_2S$ HIGH with $Q_5P$ LOW. The LOW output of 80C inhibits the operation of the the near-sync indicator. On the other hand, when $Q_5P$ goes HIGH before $Q_2S$ goes LOW the resulting LOW at the output of 38C becomes a HIGH at the output of 80C enabling the near-sync indicator. The circuit 42C-44C ensures a continuing HIGH at the output of 80C for the recurring condition $Q_5P$ HIGH with $Q_5S$ HIGH.

At the near-sync indicator the outputs of Schmidt triggers 24S, and 24P are applied to a pair of 8 stage ring counters 82S and 82P. Counter 82S is connected to provide that its 8 outputs are respectively connected to the eight latch inputs of the eight latches collectively designated, 84C. The latches have eight respectively corresponding outputs connected to eight LEDs arranged in a circle.

The potential connections of the LEDs to counter 82S are such that, with a latch connection, the LEDs are successively activated counter clockwise for increasing counter 82S counts relative to the strobing interval. The latches collectively indicated at 84C are each designed to respond to a signal referred to as a strobing signal activated by the reset pulse from cyclical counter 82P, to connect the output and input of each latch and to maintain such connection until the next strobe signal. The port engine pulses from Schmidt trigger 24P are supplied to counter 82P, which is similar to counter 82S but differently connected. The counter 82P is designed to provide a strobing pulse i.e. the reset pulse at each 'eight count' therein. The strobing pulse from 82P reset is supplied through the differentation circuit capacitor 88 and resistor 90 and isolation resistor 92 to 'set' or enable the latches in 84C as indicated by the connection from resistor 92 to the latch enable input to 84C. As each latch in 84C is set, then the input with a signal from the then-energized stage of counter 82S is connected to the output to illuminate the corresponding LED. (The internal design of each latch effects the connection of the relevant LED line to ground so that the LED is lit by positive source B+.) The action of each latch is to maintain the illumination of the LED until the next strobing pulse arrives from counter 82P. By the time the next strobing pulse arrives counter 82S will have (cyclically) counted through 7, 8, or 9 stages depending on whether the starboard engine is slower, equal or faster than the port. (In situations where the counter would count less than 7 or more than 9 starboard engine pulses between strobing pulses, the ratio of slower to faster speeds would be such as to disable the near-sync indicator and enable the out-of-sync indicator due to the operation of the out-of-sync indicator). Accordingly, with successive strobing pulses and the near-sync indicator enabled, the same LED will remain lit (indicating synchronism) or the LED lit by the previous strobing pulse will be replaced by an LED at an adjacent stage, clockwise for starboard engine LOW and counter clockwise for port engine LOW and at a circular speed which corresponds to the ratio of the slower to faster engine speeds. This enables the operator to make sensitive adjustments to the speed to reach near-synchronism. With an eight-count cycle it will be seen that for the near-sync indicator to move two latch positions (or LED positions) the slower-to-faster engine speed ratio would have to be less than $\frac{7}{8}$ (or 8/9) interval in eight strobe pulses or less than 87.5% (or 88.9%). (Considering 7 (or 9) starboard pulses to 8 port pulses). On the other hand the out-of-sync counters 28S and 28P disable the near-sync indicator at pulse rate ratios greater than 2-in-18, that is a slower-to-faster speed ratio greater than 16/18 or greater than 88.9%. Thus the speed ratio represented at counters 28S, 28P when the near-sync indicator is disabled is larger than that which would cause the LEDs 86 to skip a stage between successive strobing pulses. Obviously, if desired, to ensure an overlap between the out-of-sync and the near-sync indicators, the ratio of slower-to-faster speeds represented by the $Q_2$ to $Q_5$ interval (of the same counter) could be increased i.e. by causing $Q_5$ and $Q_2$ to go HIGH responsive to the 32nd and 30th pulses respectively in the counters 28S and 28P. (Using 32-stage counters and representing a slower-to-faster speed ratio of 30/32 or 93.75%). However, using the 18th and 16th pulses for $Q_5$ and $Q_2$ has been found satisfactory.

Conversely the number of counts in counters 82S and 82P might be lessened to lower the slower-to-faster speed ratio allowed before disabling the near-sync counter. Thus, if these counters only cycled and strobed at 6 pulses (with 6 LEDs 86) the speed ratio to cause the LED's to skip a stage between strobe pulses would be 5/6 (or 6/7)—83.3% (or 85.7%). Preferably the out-of-sync indicator is disabled when the near-sync indicator is enabled and vice versa. This is achieved in the preferred embodiment of the invention by using the signal from 34C to simultaneously enable the near-sync indicator and disable the out-of-sync indicator and vice versa. The signal at the output of inverter 80C may activate latches 84C by any conventional means. Thus the HIGH at the output of invertor 80C may be used as a control signal only but it is preferred to exert such control by having the HIGH output from inverter 80C supply the power for counter 82S operation, and the low output from inverter 80C disables the counter 82S.

The timing of the pulse stretching circuit composed of resistance 42C and capacitor 44C and diode 36C prevents off-on flashing of all LED's between pulses at the output of 34C at low engine speeds.

Switch 92' is normally closed for B+ to light the relevant LED's 1 to 8, 40P and 40S but may be opened to introduce the resistance 89 into circuit to dim the LEDs to avoid operator distraction at night.

In operation, if the starboard engine is started first, when its speed is within the operating range of the indicator, the cyclic HIGH output of $Q_5S$ and the lack of HIGH outputs at $Q_5P$ activate LED 40S indicating 'port engine low' on the out-of-sync indicator. The LOW at the output of inverter 80C disables the near-sync indicator. This indicator condition continues until the port engine is brought to a speed, having a high enough ratio to the starboard, that 34C has simultaneous HIGHs at its input and the resultant HIGH to resistor 42C and capacitor 44C (LOW at the output of 38C) turns off the out-of-sync indicator at AND gate 32S and turns on the near-sync indicator by activating counter 82S, and due to circuit 42C-44C this condition is maintained as long as the HIGH signals from $Q_5S$ and $Q_5P$ are contemporaneous every reset cycle of the counters 28S, 28P. During the period that the near-sync indicator is on, the LEDs 1,2 . . . 8 are illuminated to indicate by stepping sense and speed the ratio of slower-to-faster engine speeds. Thus the engines may be sensitively brought as close to the same speed as desired while watching the stepping of the illumination of the LEDs. If once adjusted they fall out-of-sync then the circulating LEDs will indicate this, allowing fine re-adjustment. If one engine loses speed so that the slower-to-faster speed ratio drops below that represented by the occurence of $Q_2$ HIGH for the faster engine before $Q_5$ HIGH for the slower engine the output of 34C will go low disabling the near-sync circuit to disable LEDs 86 and enable the out-of-sync circuit and to cause the lamp 40S or 40P to indicate which engine has lost speed.

Although the operation has been explained for the port engine slower it will be obvious that the operation is symmetrical and the same operation (interchanging port and starboard) takes place for the starboard engine slower. Obviously one engine (here the port) is used to produce the strobe pulses at counter 82P while the other produces the cyclical pulses at 82P. This does not substantially alter the symmetry of the operation for starboard and port engines.

Obviously the circular display of the LED's may be replaced by a linear or other progressive display stepping not more than a stage at a time. Obviously the percentage difference required for enabling the near-sync display and disabling of the out-of-sync display may be altered by altering the number of stages in counters 28S and 28P and the number of pulses (here 16-18) required to indicate 'out-of-sync'. The out-of-sync circuitry shown may, in fact be replaced by any other circuit for determining the out-of-sync condition, and determining a given porportional speed difference which is the maximum for enabling the near-sync indicator disabling the out-of-sync indicator, and below such given difference, disabling the near-sync indicator and enabling the out-of-sync indicator. For example counters 28S, 28P may be replaced by a 10-pulse counter and an 8-pulse counter, respectively, to be reset every 8 pulses of the latter. Thus, when the 10-pulse counter is over 9 or under 7 at reset, the out-of-sync lamps 40 would illuminate to show the port or starboard engine is low, respectively while the near-sync circuit was disabled. For counts at the 10-pulse counter of 7, 8, or 9 at reset the near-sync circuitry would be enabled and the out-of-sync disabled.

Other methods of determining the out-of-sync condition to control the enablement of the near-sync indicator are within the scope of the invention.

The advantages of the invention both broadly and with reference to the specific embodiment will be noted. The indicator is operable over a speed range which is limited only by design economics since it operates on proportional rather than absolute speed differences. In preferred embodiments the indicator provides coarse (out-of-sync) and fine (near-sync) adjustment ranges. The indicator with a progressive display, particularly the circular display of the preferred embodiment, is easy to interpret under operating conditions. The relative speed indication synchronism process using it is substantially symmetrical, that is, it is the same indication and process to raise or lower the port engine to synchronism with the starboard as raising and lowering the starboard engine to conform to the port. However interference is eliminated by the use of the counters and the Schmidt trigger or equivalents. The counting technique ensures absolute accuracy over wide temperature ranges.

Circuit components not specifically referred to perform functions obvious to those skilled in the art. Circuitry elements whose function is obvious to those skilled in the art have not been specifically referred to.

The invention is limited only by the appended claims. However the following values have been found suitable for components of FIG. 1, for use with gasoline engine ignition systems.

| | |
|---|---|
| 10 S, 10 P | 54KΩ |
| 12 S, 12 P | 47KΩ |
| 16 S, 16 P | 4700 pf |
| 18 S, 18 P | 13KΩ |
| 82 S, 82 P | ring counter |
| 88 | 820 pf |
| 90 | 30KΩ |
| 92 | 10KΩ |
| 84 C | latches |
| 89 | 1200Ω |
| 91 | 180Ω |
| 93 | 47 μf |
| 79 S, 79 P | 13KΩ |
| 76 S, 76 P | 47 pf |
| 70 S, 70 P | 2.2KΩ |
| 74 S, 74 P | 100KΩ |
| 58 S, 58 P | 47KΩ |
| 60 | 100KΩ |
| 28 S, 28 P | ripple counter |
| 42 C | 2.2 MΩ |
| 44 C | .1 μf |

| | |
|---|---|
| 53 S, 53 P | 100Ω |
| 52 S, 52 P | 2.2 MΩ |
| B+ | 5VDC |

I claim:

1. Synchronization indicator for a pair of rotating devices comprising:

a predetermined number of sensible elements having ON and OFF states arranged in succession to provide a progressive indication, means for deriving from each device a series of pulses at a rate proportional to its rotation rate, a latch having a predetermined number of inputs and corresponding outputs connected respectively to said sensible elements, means responsive to one series of pulses to cyclically serially activate said latch inputs, means responsive to the other series of pulses to produce a strobing pulse for every predetermined number of pulses in said series, connected to provide said strobing pulse to said latch, said latch being designed, responsive to a strobing pulse, to connect any input then activated to the corresponding output to switch ON the connected sensible element.

2. Indicator as claimed in claim 1 having means for providing an alternate indication of the ratio of slower-to-faster pulse rates when said ratio is less than a predetermined value.

3. Indicator as claimed in claim 2 wherein said means for providing an alternate indication is designed to prevent and allow said sensible elements' assuming the ON state for pulse rate ratios below and above said predetermined value, respectively, wherein said predetermined value is more than that at which successive strobe pulses will activate indicators non-adjacent in said succession.

4. Indicator as claimed in claim 3 wherein said means for providing an alternative indication comprises a counter corresponding to each series of pulses, and means for determining a predetermined ratio of slower-to-faster pulse rates, means for providing said alternative indication when said ratio is less than a predetermined amount.

5. Device as claimed in claim 3 wherein said elements are visually illuminable in ON state.

6. Indicator as claimed in claim 2 wherein said means for providing an alternative indication comprises a counter corresponding to each series of pulses, and means for determining a predetermined ratio of slower-to-faster pulse rates, means for providing said alternative indication when said ratio is less than a predetermined amount.

7. Device as claimed in claim 2 wherein said latch, having made said connection, is designed to maintain said element ON until the next strobing pulse.

8. Device as claimed in claim 2 wherein said elements are visually illuminable in ON state.

9. Device as claimed in claim 1 wherein said latch, having made said connection, is designed to maintain said element ON until the next strobing pulse.

10. Device as claimed in claim 1 wherein said elements are visually illuminable in ON state.

11. Synchronization indicator for a pair of rotating devices, comprising:

a predetermined number of sensible elements, each having ON and OFF states, the elements being arranged so that, when individually energized in a predetermined sequence, they provide a progressive display, said elements being normally in an OFF state, means for deriving from each device a series of pulses at a rate proportional to their rotation rates, means cyclically responsive to one series of pulses to individually successively designate said sensible elements, in said sequence, means cyclically responsive to the occurrence of a predetermined number of the other series of pulses to provide a strobing pulse, means responsive to said strobing pulse for turning the then-designated sensible element to the ON state.

12. Indicator as claimed in claim 11 wherein said means responsive to the strobe pulse will turn an element previously in the ON state to the OFF state.

13. Synchronism indicator as claimed in claim 12 in combination with means for ensuring that elements switched to the ON state by successive strobing pulses cannot be non-adjacent in the predetermined sequence.

14. Synchronism indicator as claimed in claim 13 wherein the number of pulses for a cycle of said cyclically responsive means responsive to said one series coincides with the number of pulses for the cycle of said strobing pulse.

15. Synchronism indicator as claimed in claim 13 wherein said means for ensuring comprises means for cyclically counting the pulses from each of said devices and for determining when the ratio of the slower to the faster pulse rate is less than a predetermined value, wherein said ratio is determined to ensure that said successive strobing pulses cannot activate non-adjacent elements and means disabling said progressive display when said ratio is less than said value.

16. Synchronism indicator as claimed in claim 15 combined with a second display responsive to said means for ensuring designed to provide an indication as to which device is rotating faster.

17. Synchronism indicator as claimed in claim 16 wherein means are provided for enabling said second display when said ratio is less than said value and for disabling said second display when said ratio is greater than said value.

18. Synchronism indicator as claimed in claim 12 wherein the number of pulses for a cycle of said cyclically responsive means responsive to said one series coincides with the number of pulses for the cycle of said strobing pulse.

19. Synchronism indicator as claimed in claim 11 in combination with means for ensuring that elements switched to the ON state by successive strobing pulses cannot be nonadjacent in the predetermined sequence.

20. Synchronism indicator as claimed in claim 19 wherein the number of pulses for a cycle of said cyclically responsive means responsive to said one series coincides with the number of pulses for the cycle of said strobing pulse.

21. Synchronism indicator as claimed in claim 19 wherein said means for ensuring comprises means for cyclically counting the pulses from each of said devices and for determining when the ratio of the slower to the faster pulse rate is less than a predetermined value, wherein said ratio is determined to ensure that said successive strobing pulses cannot activate non-adjacent elements and means disabling said progressive display when said ratio is less than said value.

22. Synchronism indicator as claimed in claim 21 combined with a second display responsive to said means for ensuring designed to provide an indication as to which device is rotating faster.

23. Synchronism indicator as claimed claim 22 wherein means are provided for enabling said second display when said ratio is less than said value and for disabling said second display when said ratio is greater than said value.

24. Synchronism indicator as claimed in claim 11 wherein the number of pulses for a cycle of said cyclically responsive means responsive to said one series coincides with the number of pulses for the cycle of said strobing pulse.

* * * * *